(12) United States Patent
Enders

(10) Patent No.: US 7,252,418 B2
(45) Date of Patent: Aug. 7, 2007

(54) LIGHTS FOR MOTOR VEHICLES

(75) Inventor: Martin Enders, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/039,992

(22) Filed: Jan. 24, 2005

(65) Prior Publication Data

US 2005/0128764 A1 Jun. 16, 2005

Related U.S. Application Data

(63) Continuation of application No. PCT/EP03/06654, filed on Jun. 24, 2003.

(30) Foreign Application Priority Data

Jul. 24, 2002 (DE) ................. 102 33 719

(51) Int. Cl.
*B60Q 1/00* (2006.01)

(52) U.S. Cl. ............ 362/464; 362/465; 362/466; 362/512

(58) Field of Classification Search ............ 362/307, 362/311, 464, 465, 466, 267, 318, 512, 539, 362/467; 315/82, 83; 427/106
See application file for complete search history.

(56) References Cited

U.S. PATENT DOCUMENTS 3,499,112 A * 3/1970 Heilmeier et al. .......... 349/177
4,652,851 A * 3/1987 Lewin .......................... 345/88
5,023,758 A * 6/1991 Allen et al. ................. 362/514
6,000,816 A * 12/1999 Serizawa et al. ........... 362/297
6,152,590 A * 11/2000 Furst et al. ................. 362/545
6,380,865 B1 * 4/2002 Pederson ................ 340/815.45
6,550,943 B2 * 4/2003 Strazzanti ................... 362/464
6,565,247 B2 * 5/2003 Thominet ................... 362/545
2002/0186569 A1 12/2002 Strazzanti

FOREIGN PATENT DOCUMENTS

| DE | 2 209 338 | 2/1972 |
|----|-----------|--------|
| DE | 43 13 914 C2 | 4/1993 |
| DE | 44 10 365 A1 | 3/1994 |
| DE | 195 40 813 C1 | 11/1995 |
| DE | 198 52 593 A1 | 11/1998 |
| FR | 2 590 965 | 11/1985 |
| FR | 2 605 086 | 10/1986 |

* cited by examiner

*Primary Examiner*—Renee Luebke
*Assistant Examiner*—Gunyoung T. Lee
(74) *Attorney, Agent, or Firm*—Crowell & Moring LLP

(57) ABSTRACT

Lights, in particular for motor vehicles, comprising at least one light source and a cover that is arranged in front of the light source in the direction of radiation, wherein the cover includes an electric diffuser which may change the optical properties thereof to generate multi-functionality.

1 Claim, 1 Drawing Sheet

LIGHTS FOR MOTOR VEHICLES

CROSS-REFERENCE TO RELATED APPLICATIONS

This application is a continuation of PCT Application No. PCT/EP2003/006654 filed on Jun. 24, 2003, which claims priority to German Application No. 102 33 719.5 filed Jul. 24, 2002.

BACKGROUND AND SUMMARY OF THE INVENTION

The invention relates to a light, in particular for motor vehicles, comprising at least one light source and a cover. The cover is arranged in front of the light source in the direction of radiation.

Lights for motor vehicles comprise one or more light sources, in which generally optical means for generating a certain light distribution are assigned. The light sources are usually arranged in a light housing, which is covered with a panel. The panel can be an optic device, for example a lens or a diffusing screen. Due to design specifications and for other design reasons also non-optic clear panels are used increasingly as the cover. All optically active elements such as lamps, reflectors and other light-guiding devices are arranged on the inside of the light. This has the advantage that the generally required adjustment possibilities, for example a height adjustment of a radiating light cone, can be implemented more easily. Clear cover panels are desirable in particular for headlights, but also increasingly for rear lights and interior lighting.

On the other hand, the above-described diverse light distribution that modern vehicle lights must provide leads to a variety of different luminous components, such as reflectors or light sources having different sizes and different colors and additional caps and diffusing elements in the light housings. In order to achieve the desired light distribution, often non-symmetrical shapes, coatings or screens are required. This, however, especially in the case of combination lights such as headlight combinations where several lighting elements are accommodated in one housing, can also lead to the fact that the unobstructed view into the inside of the light is found to be unpleasant for the overall optical impression of the light. Moreover the increasing number of functions, for example an additional day-time driving light adjustment, which is required of modern vehicle lights, leads to ever more complicated and costly designs with an increasing number of luminous components. Since in modern combination lights usually limited space is available and the exterior housing shape is basically specified by design parameters, the accommodation of additional components is problematic, additionally also leading to increased weight.

For the targeted switching and distribution of optical light beams, so-called electrical diffusers are known from the electro-technology field. These are components in which a liquid crystal layer is arranged between two transparent electrodes. By applying electric potential, the randomly distributed liquid crystals can be aligned. While the random liquid crystal layer scatters an incident optical beam diffusely, the radiation can pass unimpaired when the liquid crystals are aligned appropriately. In this way the diffuser becomes transparent for the radiation. This effect is utilized in many ways in optical elements, such as LCD displays.

Comparable optical elements are also already employed in vehicular technology, for example, in a display unit for the targeted illumination of specifiable areas of a dial face (DE 195 40 813 C1) or in a device for use as an area light and as transparent glazing (DE 198 52 593 A1).

In the display unit known from DE 195 40 813 C1, a light valve, the transparency of which is variable, is arranged between the dial face and a light source. In a preferred embodiment, the light valve is designed as a liquid crystal film, containing symbols and numbers by transparent electrodes that are applied on either side. The electrode pairs can be supplied with electric potential independently from each other. By applying electric potential to the individual electrode pairs, the film becomes transparent in the corresponding areas so that in those areas transillumination occurs in the direction of the observer on the side facing the dial face. In the remaining areas, the light of the light source is scattered. An additional dark transparent covering pane moreover absorbs the diffused light so that the numbers become visible only in the areas in which the liquid crystal film is subject to electric potential. The objective is to create a display unit in which the symbols and numbers can be varied in a simple fashion between a normal display and a visually differing type of display.

The disadvantage is that the light valve switches only individual numbers of the film or of the dial face into transparent mode via the individual electrode pairs. Such a light valve is not suitable for vehicular lights. The expert only receives the information that a light valve should be used in connection with a display unit.

In the device known from DE 198 52 593 A1 for use as an area light and as transparent glazing, a panel is arranged on the side of a pane that faces away from the direction of light beam. On the end face of the pane a light source is arranged, which, via a pane edge, can be coupled into the pane. The pane comprises scattering points, in which the coupled light is scattered to all sides. The panel can be switched into transparent or specular reflecting mode. In the reflecting state, the light that is scattered from the pane in the direction of the panel is reflected from the surface of the panel in a desired direction, and in a preferred embodiment into the inside of a vehicle. The panel then serves as the area light when actively connected with the pane and the light source. When the light source is switched off, the panel is switched in the transparent mode and then serves as overhead glazing in the roof of the vehicle.

The disadvantage of this known device is that the permanent cattering points in the pane limit transparency, thus preventing complete transparency. Since the pane is arranged first in the direction of the light beam, while the panel is arranged on the other side of the pane, the arrangement of the pane impairs the view through the panel. The degree of scattering cannot be varied on the pane. This limits the adjustment possibilities of the light. The pane represents an additional costly component. Moreover, it leads to increased energy consumption since the panel is switched in the transparent mode when the light is turned off by the permanent supply of electric potential.

It is therefore one of many objects of the present invention to create a vehicle light, using as few luminous components as is possible, that has a high functional diversity, can be used in a flexible fashion and makes a high-quality optical impression.

This object is achieved according to the invention by providing a light especially for motor vehicles, including at least one light source and a cover that is arranged in front of the light source in the direction of radiation, wherein the cover has an electrical diffuser that can change its optical properties to generate multi-functionality.

Due to the fact that the cover comprises an electrical diffuser, the light distribution level of radiation passing through the cover can be influenced. This offers the opportunity of generating different light distribution levels that are adapted to the application by means of the cover. The number of luminous components can be reduced, which has a cost-saving effect. The decrease in the number of components also leads to weight savings. Moreover, a more compact construction is possible by saving space.

It is possible to use commercially available diffuser models or models that were produced specifically based on the known design. In principle, a liquid crystal layer is arranged between two transparent area layers, which can be subjected to electric potential and are designed as an electrode pair. By applying electric potential, the light transmission level can be influenced specifically by the diffuser. The diffuser can be connected to the cover and form a single component with it. It is, however, also templated that the diffuser represents a separate component, which is assigned to the cover.

Pursuant to a preferred embodiment of the invention, the diffuser assumes a first functional state, in which it is switched into an opaque, view protection mode, which prevents viewing in the direction of the light source.

In the first functional state, the diffuser forms a view protection by remaining without electric potential and acting as a diffusing screen. Scattering of the light prevents a view into the inside of the light. The luminous components are hence not visible, particularly when the light source is switched off. In this way, the inside of the light, i.e. the luminous components, can be designed without consideration of its appearance to the observer, resulting in a design advantage.

Pursuant to another preferred embodiment of the invention, the diffuser is designed in a second functional state, in which it can be varied between randomly translucent and transparent when the light source is switched on, as a device for generating application-specific light distribution.

By applying electric potential on the electrode layers, the diffuser can be switched into transparent mode. By controlling the electric potential appropriately, the level of alignment of the liquid crystals in the diffuser can be adjusted. Here, also, intermediate steps between an opaque diffuse cover and a completely transparent cover are possible. In this way, the light distribution can be adapted to the respective application of a light, and the light hence has very flexible uses.

Through the function of the cover with the diffuser as an optical element that can be varied between a protected view and an application-adapted light distribution level the multi-functionality feature is achieved.

Pursuant to another preferred embodiment of the invention, a light housing that is covered by a cover comprising the diffuser forms a headlight together with at least one luminous component that is arranged in the light housing.

In the case of headlights, the diffuser can be employed particularly beneficially since here, frequently, clear cover panels are used. By switching the diffuser to "opaque", the technical details of the headlight are not visible when the light is switched off. The possibility of radiating light at the "transparent" setting when the light is switched on and radiating only scattered light at the "diffuse" setting results in a savings potential in terms of luminous components since no separate luminous components are required for the focused radiation and the scattered radiation.

Pursuant to another preferred embodiment of the invention, the radiation of the headlight can be switched between a daytime driving light, in the case of a diffuser that is switched to randomly translucent, and high beam, in the case of a diffuser that is switched to transparent, when the light is turned on, and the diffuser assumes its first functional state when the light is turned off.

The use of the diffuser for switching between high beam (focused radiation to illuminate the road) and a daytime driving light (scattered radiation for better visibility of the vehicle) is especially inexpensive and weight-saving since additional components for the daytime driving light can be foregone. In the switched-off state, the view protection feature is beneficially activated.

Pursuant to a further preferred embodiment of the invention, the light housing that is covered with the cover comprising the diffuser forms an indicator lamp together with the at least one luminous component that is arranged in the light housing.

Indicator lamps are implemented increasingly with uncolored and at least partially clear cover panels and colored bulbs or otherwise colored light sources. Here, the diffuser can serve especially beneficially as a view protection since a colored bulb is considered rather optically disadvantageous. Due to the cover panel, the optical properties of which can be varied, the indicator lamp can be designed especially cost-effective comprising few components.

Pursuant to another preferred embodiment of the invention, the indicator lamp is designed as a rear light, in which the diffuser is switched to the randomly translucent mode when the taillight is turned on, and in which the diffuser assumes its first functional state when the taillight is turned off, and in which the diffuser is switched to be transparent when the brakes are actuated, wherein a brake light is radiated.

The multi-functionality of the cover is especially important in rear light combinations since, here, the taillight and brake light can be implemented with a view protection in a particularly compact and cost-effective manner. Moreover, the diffuse radiation generates a particularly homogeneous taillight and the preferably completely transparent cover generates a focused, bundled and hence especially conspicuous brake signal when the brake is actuated.

Pursuant to another preferred embodiment of the invention, the indicator lamp is designed as a flashing light, in which the diffuser is switched to the transparent mode when the flashing signal is turned on, and in which the diffuser assumes its first functional state when the flashing signal is turned off.

The generally yellow bulbs used in flashing lights with clear cover panels are covered by the diffuser without allowing a view inside when the flashing signal is not turned on. Especially in light combinations, in which the flashing lights are frequently included as an integral component, the view protection function improves the optical appearance of the light for the observer. When the flashing signal is turned on, the cover can be completely transparent in order to radiate an especially clear flashing signal. This radiation is considered optically more beneficial as compared with radiation that is generated with conventional covers having a scattering effect.

In principle, individual cover parts can also contain separate diffusers in light combinations in order to switch the various desired optical effects of the individual luminous components that are assigned to a cover section separately in the light combination.

Pursuant to another preferred embodiment of the invention, the light housing that is covered by a cover including the diffuser forms an interior light, together with the at least one luminous component that is arranged in the light housing. The radiation of the interior light can be varied between an area interior light when the diffuser is switched to the randomly translucent mode and a focused reading light when the diffuser is switched to the transparent mode.

The diffuser/cover allows an inexpensive interior light to be implemented, which can be used optionally to illuminate the area, preferably on the inside of a vehicle, or as a reading light by radiating a focused light cone. In the switched-off state the diffuser serves as a view protection feature. In this way, the interior light has a flat construction and adapts harmonically to an adjoining inside molding of the vehicle.

Pursuant to a further preferred embodiment of the invention, the light source is designed as a bulb or as a gas discharge lamp or as an LED, and the luminous component is designed as the at least one light source or as an application-specific combination of the at least one light source with the at least one reflector.

The luminous components of the light can be designed appropriately for the respective application. Various combinations of light source and reflectors, as well as of additional elements with optical effects, are possible. Light emitting diodes, abbreviated as LEDs, are suited for interior, signal and rear lights due to their low space requirements and their low heat dissipation especially for the combination with a diffuser.

Other objects, advantages and novel features of the present invention will become apparent from the following detailed description of the invention when considered in conjunction with the accompanying drawings.

DETAILED DESCRIPTION OF THE DRAWINGS

A light for motor vehicles consists essentially of a light source 2, 2', which is arranged in a light housing 6, 6', in which the light housing 6, 6' is covered with a cover 19 that includes an electrical diffuser 1.

Figure 3:
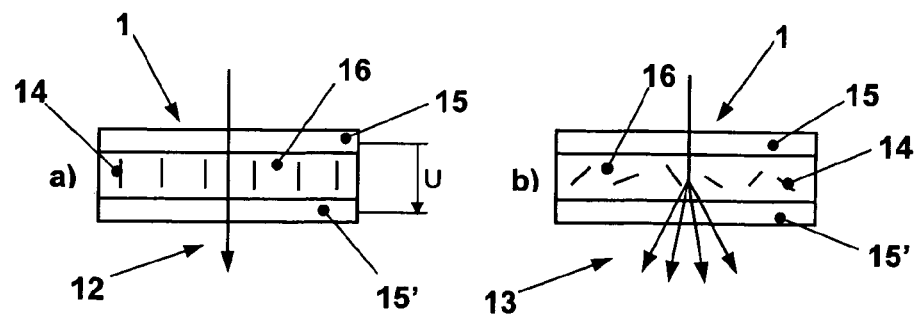
FIG. 3 is a diagrammatic illustration of the operating principle of an electrical diffuser, such as
 a) when electric potential is applied,
 b) without electric potential.

The diffuser 1 has a conventional design (FIG. 3). A liquid crystal layer 16 is arranged between two areal transparent electrodes 15, 15'. One of the two electrodes 15, 15' serves as a carrier. By applying electric potential U the liquid crystals 14, which in the non-energized state are distributed randomly, become aligned along the field vector. When optical radiation meets with an electrode area, it is scattered in the non-energized state on the random liquid crystals 14, resulting in diffuse light distribution 13 for the radiation emitted from the diffuser 1. When electric potential U is applied, the incident radiation, however, can pass the liquid crystal layer 14 nearly unimpaired so that the emitting radiation is unchanged, i.e. in the case of an incident focused light beam the aligned light distribution 12 is maintained. By suitably selecting the electric potential U, intermediate steps can be adjusted between a completely diffuse and completely transparent optical effect of the diffuser 1.

Figure 1:
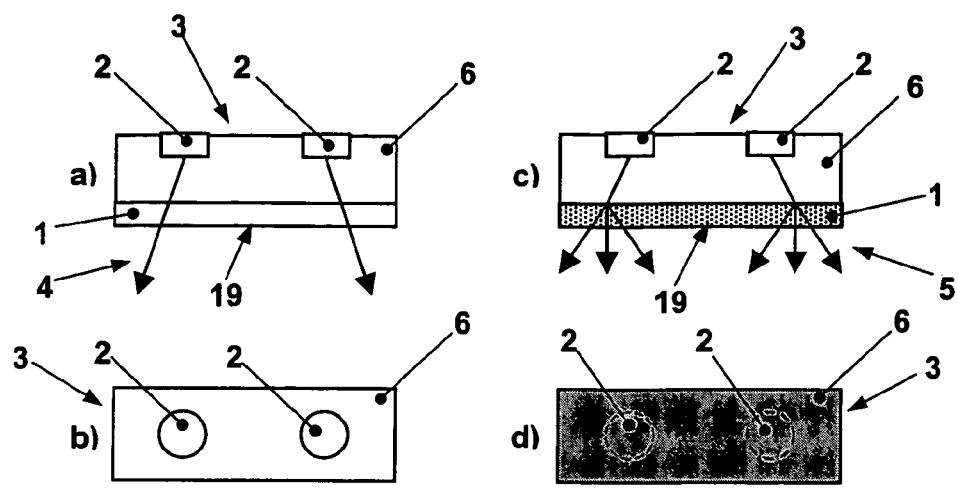
FIG. 1 is a diagrammatic illustration of a light for use as an interior light, such as
 a) as a reading light in a sectional side view,
 b) as the reading light from a top view,
 c) as an interior space light in a sectional side view,
 d) as the interior space light from a top view.

FIG. 1 shows in a simplified illustration an interior light 3 for vehicles. The diffuser 1 is beneficially connected to the cover 19 and covers the light housing 6. In the housing 6, two light sources 2 are arranged, preferably as light emitting diodes (LEDs). In the left half of the image FIG. 1a, the diffuser 1 is switched in the transparent mode so that the radiation exits unchanged and fulfills an application as a focused reading light 4. In the top view in FIG. 1b, the light 3 can be viewed with the light sources 2. In the right half of FIG. 1c, the diffuser 1, however, is switched into the randomly translucent mode, resulting in diffuse light distribution as an area interior light 5 for illuminating the interior space of the vehicle. In the top view of FIG. 1d, the observer here sees a diffusely luminous surface. The interior light 3 can hence fulfill two functions, namely that of the reading light 4 and that of the inside light 5, without requiring separate luminous components inside the light for the two functions. When the light sources 2 are turned off, the diffuser 1 is beneficially without electric potential. The cover 19 is then opaque to the viewer, and he only sees a milky diffuse panel.

Figure 2:
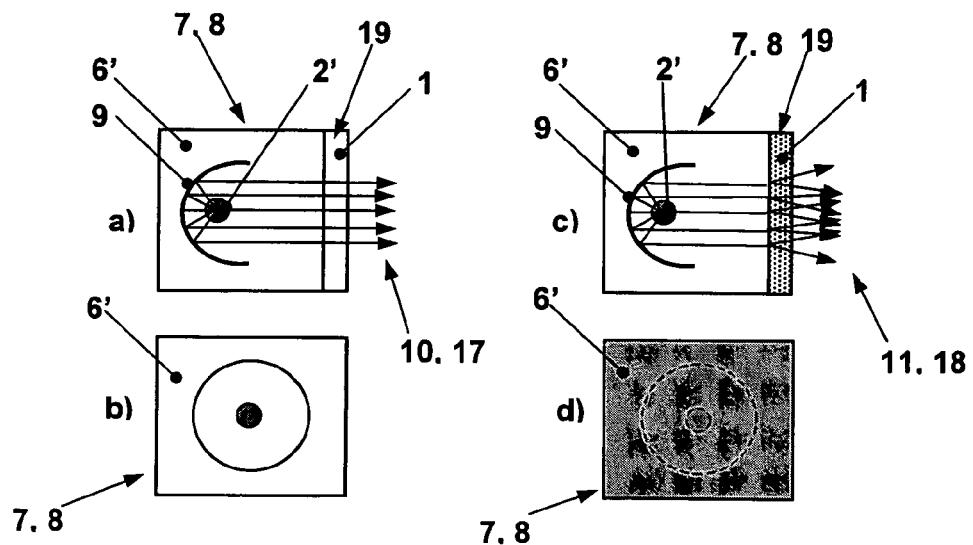
FIG. 2 is a diagrammatically simplified illustration of the light for use as a headlight or rear light, such as
 a) as a brake light/high beam in a sectional side view,
 b) as the brake light/high beam from a top view,
 c) as a taillight/daytime driving light in a sectional side view,
 d) as the taillight from a top view.

Another preferred embodiment is shown in FIG. 2. The simplified illustration applies to a headlight 7, but can be applied analogously also to an indicator lamp 8, and here especially to a rear light. In the light housing 6', the light source 2', which is beneficially designed to be a bulb, is located in the focal point of a reflector 9. In the illustration in FIG. 2a, electric potential is applied to the diffuser 1, analogously to the embodiment in FIG. 1, i.e. it is switched into the transparent mode. The focused radiation of the luminous component consisting of the bulb 2' and the reflector 9 can be applied in the case of the headlight 7 as a high beam 10 and in the case of the rear light 8 as a brake light 17. In the top view of FIG. 2b, (basically), a view into the inside of the light is possible. By contrast, in FIG. 2c, the diffuser 1 is again switched to the randomly translucent mode, which is expressed in FIG. 2d, as a randomly luminous headlight surface. This results, accordingly, in a randomly scattered radiation, which can be used as a daytime driving light 11 of the headlight 7, or as a taillight 18 of the rear light 8. The light can fulfill two functions, respectively, as the headlight 7 or as the taillight 8 analogously to the interior light 3 while saving luminous components and providing a protected view feature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| Table of Reference Numbers | |
|---|---|
| 1 | Electrical Diffuser |
| 2, 2' | Light Source |
| 3 | Interior Light |
| 4 | Reading Light |

-continued

Table of Reference Numbers

| | |
|---|---|
| 5 | Inside Light |
| 6, 6' | Light Housing |
| 7 | Headlight |
| 8 | Indicator Lamp |
| 9 | Reflector |
| 10 | High Beam |
| 11 | Daytime Driving Light |
| 12 | Focused Radiation |
| 13 | Random Radiation |
| 14 | Liquid Crystals |
| 15, 15' | Electrode |
| 16 | Liquid Crystal Layer |
| 17 | Brake Light |
| 18 | Taillight |
| 19 | Cover |

What is claimed is:

1. A motor vehicle light, comprising:

at least one light source;

a cover arranged in front of said at least one light source in a direction of radiation, wherein said cover includes an electrical diffuser having optical properties that change to provide variable light distribution modes between an opaque diffuse mode and a transparent mode; and a light housing, said light housing being covered with said cover including the electrical diffuser to form an indicator lamp having at least one luminous component arranged inside the light housing, wherein the indicator light is a rear light, in which the diffuser is switched to a random translucent mode when a tail light is switched on, and in which the diffuser assumes an opaque state when the tail light is switched off, and in which the diffuser is switched into a transparent mode when a brake light radiates.

* * * * *